UNITED STATES PATENT OFFICE.

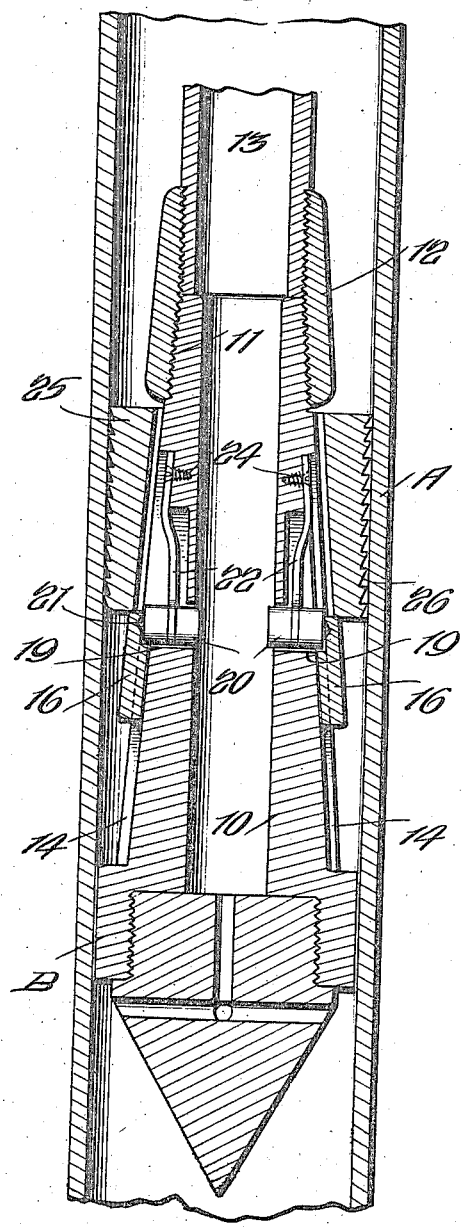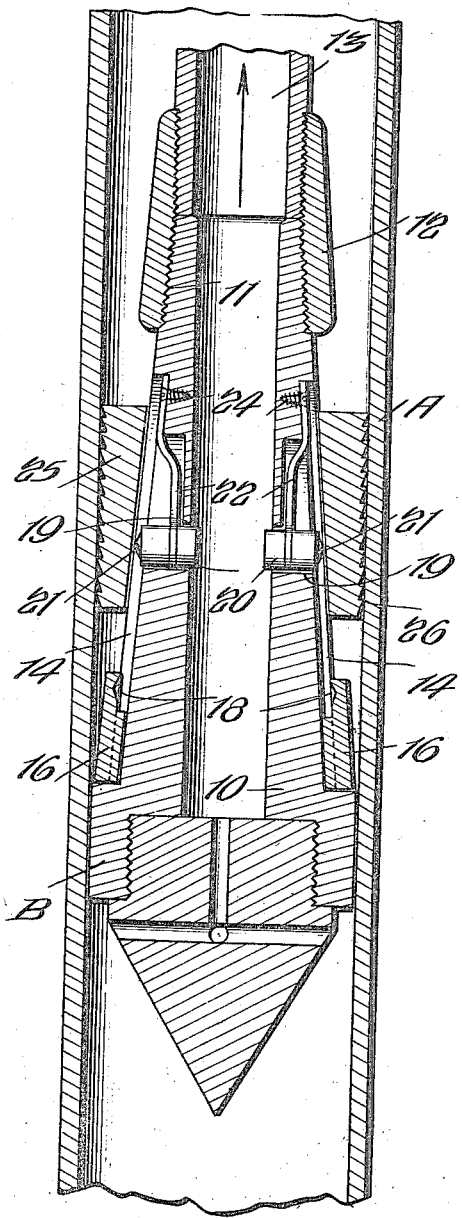

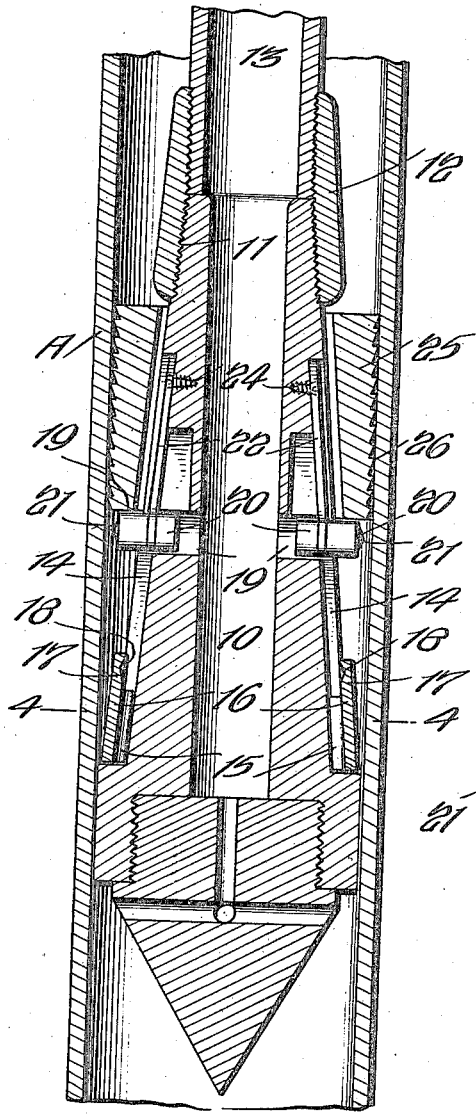
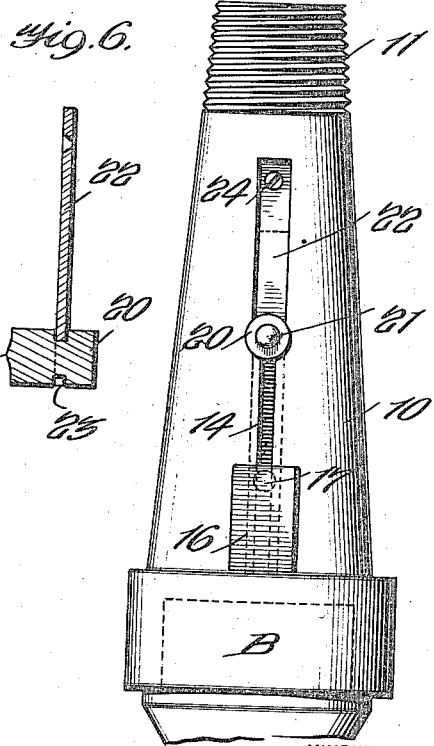

HARRY C. BREWSTER, OF SHREVEPORT, LOUISIANA.

CASING-SPEAR AND TRIP THEREFOR.

1,193,452.  Specification of Letters Patent.  Patented Aug. 1, 1916.

Application filed March 7, 1916. Serial No. 82,725.

*To all whom it may concern:*

Be it known that I, HARRY C. BREWSTER, a citizen of the United States, and a resident of Shreveport, in the parish of Caddo and State of Louisiana, have invented a certain new and useful Improvement in Casing-Spears and Trips Therefor, of which the following is a specification.

My present invention relates generally to casing spears, and more particularly to a casing spear including a trip whereby the spear may be removed independently of the pipe in connection with which it is engaged, in the event the latter cannot be withdrawn, my object being to provide a simple, inexpensive device substantially automatic in its action and which may be readily controlled from the surface, for the purpose of disengaging the spear when desired.

A further object of my invention is to provide a tripping arrangement which may be utilized in connection with casing spears of different designs, and one which will be durable and effective in use.

Referring now to the accompanying drawings in which my invention is shown, Figure 1 is a longitudinal section through a pipe and a casing spear embodying my improvements lowered within the pipe and before engagement. Fig. 2 is a similar view illustrating the spear firmly engaged with the pipe. Fig. 3 is another similar view illustrating the spear tripped for removal independent of the pipe. Fig. 4 is a detail cross section taken substantially on line 4—4 of Fig. 3. Fig. 5 is a side elevation of the spear removed. Fig. 6 is a longitudinal section through one of the laterally movable plungers and its controlling spring.

Referring now to these drawings, I have shown in Figs. 1 to 3 inclusive, a pipe to be withdrawn, at A and into which the spear generally indicated at B is lowered, this spear including a tapering body or mandrel 10 threaded at its smaller upper end at 11 for connection by means of a threaded coupling 12 to the tube 13 at the lower end of which the spear is carried.

Immediately above its lower enlarged head, the spear is provided at diametrically opposite points in the lower portion of its tapering body or mandrel 10, with longitudinal dove-tailed grooves 14 in which are slidably disposed the dove-tailed ribs 15 of slide rests 16, the upper ends of which have extensions 17 provided in their inner faces with shallow conical recesses 18.

At points adjacent the upper ends of the grooves 14 and substantially centrally of the length thereof, the mandrel 10 is provided with transverse diametrically opposed openings 19 in which are loosely and movably disposed the laterally movable plungers 20 having conical projections 21 at their outer ends for engagement within the recesses 18 of the slide rests when the latter are raised to the position shown in Fig. 1, such engagement maintaining the laterally movable plungers 20 in their inner retracted positions, these plungers being movable outwardly upon disengagement from the slide rests through the action of springs 22, the lower ends of which engage annular grooves 23 of the plungers as shown in Fig. 6, and the upper ends of which, as shown in Figs. 1 to 3 inclusive, are anchored at 24 in upper cut out portions of the mandrel 10.

Disposed around the mandrel 10 is a tubular pipe gripping member 25, the outer surface of which is provided with series of annular teeth 26 projecting toward the upper smaller end of the mandrel, and the inner bore of which is tapered in conformity with the taper of the mandrel, so that when the latter is lowered into the pipe and drawn upwardly, the relative action of the conical face of the mandrel and the inner conical surface of the gripping member 25 results in expanding the latter to firmly engage its teeth 26 with the inner face of the pipe A in order that continued upward movement of the mandrel will result in elevating and withdrawing the pipe.

Inasmuch as it sometimes results, however, in the necessity for abandoning the spear itself when the pipe cannot be withdrawn, I utilize my improved trip by first raising the slide rest 16 when the spear is to be introduced into the pipe, and engaging the plunger therewith, as shown in Fig. 1.

Thus, after lowering movement into the pipe, and when the spear is again drawn upwardly, the lower edge of the tubular gripping member 25 forces the slide rest 16 downwardly, releasing the plungers 20. Inasmuch, however, as the lower edge of the gripping member 25 is opposite the plungers at the time of their release from the slide rest 16, the plungers are still prevented from outward movement. In the event, however, that the pipe A cannot be withdrawn, the mandrel is again lowered, moving the plungers 20 downwardly therewith to a point below the lower edge of the gripping member 25, at which point they spring outwardly under the expansive action of the spring supporting members 22 and thus provide for engagement beneath the lower edge of the gripping member 25 at a point of the mandrel where the inner surface of the said gripping member is spaced from the outer face of the mandrel. Due to this engagement with the gripping member, it may be readily seen that withdrawal of the entire spear from the pipe A is permitted.

The improved tripping means presented by my invention are, as thus described, simple, accurate, and economical for the purpose, and are entirely automatic in their action. Furthermore, my improved tripping means are susceptible of use in connection with casing spears of various design, so long as they employ a tapered mandrel and a gripping member of the type as shown and above described.

I claim:—

1. A casing spear including a tapered mandrel having its smaller end uppermost and provided with vertical dove-tailed grooves in the lower portions of its sides and with transverse diametrically opposed openings at the upper ends of said grooves, laterally movable plungers disposed in the said openings, slide rests having dove-tailed ribs slidably disposed in the said grooves and having extensions at their upper ends, said extensions and the outer ends of said plungers having relatively engaging projections and recesses, spring supporting members engaging the said plungers and secured to the mandrel whereby to force the plungers outwardly, and a tubular gripping member disposed around the mandrel, having an outer toothed gripping surface and an inner tapered surface conforming to the taper of the mandrel.

2. A casing spear comprising a tapered mandrel having its smaller end uppermost, a tubular gripping member disposed around the mandrel and provided with an outer toothed gripping surface and an inner tapered surface conforming to the tapered surface of the mandrel, laterally movable plungers having guided movement in the mandrel at points below the lower edge of the said gripping member when the latter is in its upper released position, springs normally engaging the said plungers to move the latter outwardly, and bearing members movable on the mandrel and normally engaging the said plungers to prevent outward movement thereof.

3. A casing spear comprising a tapered mandrel having its smaller end uppermost, a tubular gripping member disposed around the mandrel and provided with an outer toothed gripping surface and an inner tapered surface conforming to the tapered surface of the mandrel, laterally movable plungers having guided movement in the mandrel at points below the lower edges of the said gripping member when the latter is in its upper released position, springs normally engaging the said plungers to move the latter outwardly, bearing members movable on the mandrel and normally engaging the said plungers to prevent outward movement thereof, said bearing members having dovetailed ribs, and said mandrel having dovetailed grooves in which the ribs are slidably disposed in order to movably support the said bearing members.

4. A casing spear comprising a tapering mandrel, a gripping member disposed therearound, and provided with a tapering bore and with an outer gripping face, laterally movable spring actuated plungers carried by the mandrel intermediate its ends and below the lower edge of the said gripping member when the latter is in its uppermost position with respect to the mandrel, and means carried by the mandrel for normally engaging and holding said plungers in retracted position, said means being in the path of lowering movement of the gripping member and releasable thereby from said plungers to free the latter.

5. A casing spear comprising a tapered mandrel, a gripping member disposed therearound and provided with a tapering bore and with an outer gripping face, laterally movable spring actuated plungers carried by the mandrel intermediate its ends and below the lower edge of the said gripping member when the latter is in its uppermost position with respect to the mandrel, and means carried by the mandrel for normally engaging and holding said plungers in retracted position, said means being disposed in the path of movement of the said gripping member along the mandrel and releasable thereby.

6. A casing spear comprising a tapering mandrel, a gripping member disposed therearound and provided with a tapering bore and with an outer gripping face, laterally movable spring actuated plungers carried by the mandrel intermediate its ends and below the lower edge of the said gripping member when the latter is in its uppermost position with respect to the mandrel, and means carried by the mandrel for normally engaging and holding said plungers in retracted position, said means consisting of rests having sliding engagement with the mandrel and projecting beyond the outer surface thereof for engagement by the said gripping member in its movement along the mandrel.

HARRY C. BREWSTER.